2,799,973
SOIL CONDITIONING

Keith L. Smith, Charleston, W. Va., assignor to Union Carbide Corporation, a corporation of New York No Drawing. Application April 15, 1953,
Serial No. 349,088

8 Claims. (Cl. 47—58)

The present invention relates to methods of improving the granule stability of surface soils.

The problems encountered in the conditioning of soils have been discussed heretofore in U. S. Patent No. 2,625,529, issued January 13, 1953, to R. M. Hedrick and D. T. Mowry. According to this disclosure, the tilth of surface soils is improved by mixing the soil with a small amount of synthetic water-soluble polymers having average molecular weights in excess of 10,000. While these polymers are effective for this purpose, they are relatively expensive materials, which limits their wide-spread adaptability. In addition, water-solutions of these polymers are highly viscous, which makes it difficult to apply them in this manner. On the other hand, if the polymers are applied to the soil in solid form, their hygroscopicity causes them to sorb water and form gummy masses. Such masses are difficult to apply and also to work into the soil.

According to this invention, a class of materials for soil conditioning has been found which are relatively low molecular weight products compared to the above-described polymers and which are not necessarily water-soluble. Despite their difference in character from the polymers previously used, these materials have the ability to stabilize soil granules against the action of water and otherwise condition the soil to improve its tilth. The undesirable action of water on soil granules includes several processes. Initially water causes the soil granules to break down or slake to primary soil particles or smaller granules. Secondly, these primary soil particles and very small soil granules tend to plug the capillary pores in the soil. Such plugging adversely affects the drainage, aeration, friability and erosion resistance of the soil. In soils of high granule stability, these effects are less pronounced. By incorporating small amounts of the materials of this invention in the soil, its granule stability can be markedly improved.

The materials of this invention comprise rosin acid or acids or the salts thereof including the inorganic and amine salts of rosin acid. By rosin acid broadly, I include wood rosins, commercial abietic acid, the abietic acid of tall oil whether isolated or not, the hydrogenated, oxidized, heat-treated, polymerized or dehydrogenated products of rosin acid; and the various rosin-acid containing waste products and by-products. The salts of the rosin acids may include any of the metal salts, but the sodium, zinc, cupric, ammonium, calcium, magnesium, and potassium salts are preferred. Also useful are the barium, cobalt, lead and ferric salts. Among the amine salts of rosin acids, there may be used the ethanolamine, butylamine, 2-ethylhexylamine, ethyl amine, ethylene diamine, diethylene triamine, and tetraethylene pentamine salts. Water solubility does not appear to be an essential requirement for a soil granule stability effect for, of the preferred rosin acid salts, the sodium, ammonium and potassium salts are water-soluble, but the zinc, cupric, magnesium and calcium salts are water-insoluble.

Extensive tests indicate that the rosin acids and their salts are unique as soil conditioning agents, as an extensive class of organic acid salts were tested and found to have practically no effect with the exception of the rosin acid salt. The results are shown in Table I below on tests conducted on a soil having a very poor natural granule stability.

TABLE I

Granule retention of Calhoun silt soil treated with 0.1% on dry soil weight of the sodium salts of different organic acids

| Treatment Material | Granule Retention, Percent |
|---|---|
| Control, no treatment | 1.6 |
| Sodium itaconate | 1.3 |
| Sodium barbiturate | 1.4 |
| Sodium cinnamate | 1.5 |
| Sodium levulinate | 1.7 |
| Sodium citrate | 1.0 |
| Sodium gallate | 1.4 |
| Sodium benzoate | 1.2 |
| Sodium mercaptopropionate | 1.2 |
| Sodium fumarate | 1.1 |
| Sodium glycolate | 1.3 |
| Sodium furoate | 1.2 |
| Sodium pyrogallate | 1.1 |
| Sodium sorbate | 1.3 |
| Sodium tetrahydrotoluate | 1.1 |
| Sodium sebacate | 1.4 |
| Sodium succinate | 1.4 |
| Sodium sulfamate | 1.3 |
| Sodium 1-naphthyl-4-sulfonate | 1.5 |
| Sodium tannate | 1.2 |
| Sodium palcosulfonate | 1.0 |
| Sodium nicotinate | 1.2 |
| Sodium 2-naphthylamine-1-sulfonate | 1.0 |
| Sodium thiosalicylate | 1.1 |
| Sodium thioglycolate | 1.2 |
| Sodium sulfonilate | 1.4 |
| Sodium pyruvate | 1.2 |
| Sodium myristate | 1.4 |
| Sodium 1-amino-8-naphthol 3,6-disulfonate | 1.4 |
| Sodium salt of commercial abietic acid | 9.7 |

The following is a description of the soil granule stability test referred to in this specification:

Soil to be used in a granule stability test is first dried at 70° C. under vacuum and then pulverized to pass a 20-mesh sieve. To 50 grams of this soil is added a solution or dispersion of 0.05 grams (or other test quantity) of treatment material in 15 ml. of tap water. This is thoroughly mixed with a stiff spatula and extruded through a 10-mesh sieve. The extruded soil filaments are then dried in a forced-convection oven at room temperature and pressure for about 48 hours. Twenty-five grams of this material are then weighed out and placed in a 1000 ml. graduate containing 600 ml. of water. The cylinder is upended once, and allowed to stand for 30 minutes. The cylinder is then upended 30 times and the contents poured onto a 60-mesh sieve. The sieve and its contents are then raised and lowered into and out of a pan of water for 30 times. The amount of soil on a dry basis remaining on the sieve is then determined. The weight of this soil, divided by 25 grams, times 100, equals the percentage soil granule stability or soil granule retention.

The effect of soil conditioners in improving soil granule stability varies with the type of soil, and the action of the soil conditioning agents of this invention is in apparent accord with this rule. Furthermore, testing of a soil conditioner with only a few types of soils will not adequately characterize soil conditioner action generally. Soils are classified according to texture class and soil series, one such classification by texture class being as follows:

CLASSIFICATION OF SOILS

| Sands | Silts |
|---|---|
| Loamy sands | Silty clay loams |
| Sandy loams | Silty clays |
| Sandy clay loams | Clay loams |
| Loams | Sandy clays |
| Silt loams | Clays |

The rosin acids and their salts have been tested as soil granule stability agents with numerous soil series representative of most of these texture classes. In general, in common with other soil conditioning agents, they are more effective with soils of intermediate texture, and less effective with the sands and clays. While the agents of this invention are relatively effective in conditioning soils of almost all types of soil texture, they are only moderately effective with the silts. In Table II to follow, soil granule stability tests are given for all types of soil texture using sodium abietate in comparison with a commercial soil conditioner which is reported to be the mixed calcium-sodium salt of a vinyl acetate-maleic anhydride copolymer ("Krilium" 6). In the table, the soil texture is given as well as the number of soils in each class tested. The results are an average of the test values for each class.

TABLE II

*Soil granule stability tests with different soils*

| Texture Class and Number of Soils Tested in Each Class | Percent Granule Retention | | |
|---|---|---|---|
| | Control | 0.1% Sodium Rosinate | 0.1% "Krilium" 6 |
| Sands and loamy sands (4) | 23.85 | 60.83 | 36.55 |
| Sandy loams (4) | 26.15 | 72.8 | 53.85 |
| Fine sandy loams (8) | 17.34 | 67.8 | 59.01 |
| Very fine sandy loams (2) | 8.1 | 83.0 | 46.20 |
| Loams (3) | 17.43 | 70.9 | 76.00 |
| Silt loams (26) | 8.01 | 49.2 | 61.22 |
| Silts (2) | 3.95 | 18.1 | 50.70 |
| Silty clay loams (4) | 4.93 | 64.7 | 41.50 |
| Silty clays (2) | 8.60 | 75.9 | 30.40 |
| Clay loams (42) | 26.86 | 53.6 | 52.70 |
| Clays (9) | 49.34 | 59.9 | 58.46 |
| Grand averages | 20.90 | 57.09 | 55.08 |

As previously indicated, soils are classified by the United States Department of Agriculture according to soil series, and within any series the soil may vary in texture. One such series is Pope, and the following Table III presents soil granule stability tests on soils of different texture in the Pope series.

TABLE III

*Granule stability of Pope series soils, effect of soil texture*

| Soil Texture | Land Use | Percent Granule Stability | | |
|---|---|---|---|---|
| | | Control | 0.1% "Krilium" 6 | 0.1% Sodium Rosinate |
| Loamy sand | Cornfield near river | 26.0 | 41.6 | 56.4 |
| Sandy loam | do | 17.8 | 60.6 | 77.7 |
| Fine sandy loam | Cornfield recently flooded | 11.4 | 84.8 | 59.2 |
| Fine sandy loam | do | 7.0 | 60.0 | 56.3 |
| Loam | Cornfield near river | 3.9 | 72.4 | 83.9 |
| Silt loam | Cultivated field now in weeds | 1.6 | 72.1 | 75.2 |
| Silty clay loam | do | 1.6 | 74.9 | 57.5 |
| Silty clay loam | Weeds, better drained than sample immediately above | 1.8 | 40.4 | 53.9 |

The rosin acids and their salts are effective conditioning agents at relatively low concentrations, and, in fact, are more effective at low concentrations than presently used soil conditioners. Since the present cost ratio of rosin acids and their salts to synthetic polyelectrolytes is about one to ten, the treatment costs per acre to obtain a certain level of granule stability with the rosin acids or salts is far less than with presently used synthetic polyelectrolytes. Table IV to follow shows the effect of concentration of soil conditioner on soil granule retention. As shown in the table, the effectivenesss of sodium rosinates begins to decline or become constant at concentrations above 0.5%.

TABLE IV

*Granule retention of Paulding clay when treated with various concentrations of soil conditioners*

| Material | Percent Concentration on Dry Soil Weight | | | | | | |
|---|---|---|---|---|---|---|---|
| | 0.005% | 0.01% | 0.05% | 0.1% | 0.2% | 0.5% | 1.0% |
| "Krilium" 6 | 31.6 | 33.9 | 35.2 | 54.5 | | 93.3 | |
| Sodium "Tallex"[1] | 24.3 | 36.7 | 50.9 | 59.7 | 62.7 | 74.0 | 57.6 |
| "Vinsol NVX"[2] | | | 33.8 | 45.2 | 48.9 | 61.8 | 60.0 |
| "Tallso"[3] | | | 35.8 | 43.2 | 52.0 | 47.0 | 49.8 |
| Sodium "Liqro"[4] | | | 48.3 | 45.5 | 51.1 | 58.4 | 61.8 |

[1] "Tallex" is crystalline abietic acid separated from the other constituents of distilled tall oil (West Virginia Pulp and Paper Company).
[2] "Vinsol NVX" is the sodium salt of Vinsol Resin, which is a resin still-bottom acid, softening point (A. S. T. M.) 106° C. (Hercules Powder Company).
[3] "Tallso" is the crude sodium salt of "Liqro," containing 35% moisture as well as occluded black liquor. "Liqro" is defined as undistilled whole tall oil. In these experiments the amount of "Tallso" used is based on contained dry matter (West Virginia Pulp and Paper Company).
[4] "Liqro" is defined as undistilled whole tall oil (West Virginia Pulp and Paper Company).

A number of materials containing rosin acid or acids have been tested as soil conditioning agents, and in general the purer materials are the most effective, but materials containing as low as 40% rosin acid show considerable effect. The materials tested are shown in Table V to follow.

TABLE V

*Materials containing rosin acids as soil conditioners*

| Material | Average Granule Retention, Paulding Clay Soil Plus 0.1% of Additive, Percent |
|---|---|
| None | 20.8 |
| "Tallex" | 38.3 |
| "Liqro"[1] | 32.0 |
| "Low Viscosity Whole Tall Oil"[1] | 38.0 |
| "Rosoil"[1] | 33.1 |
| "Indusoil," Triple Grade[1] | 26.6 |

[1] Tall oil products of various degrees of refining by distillation (West Virginia Pulp and Paper Company).

In general, the salts of rosin acids are more effective soil conditioning agents than the rosin acids themselves. Table VI below gives test results on various salts of abietic acid and rosin acid-containing materials.

TABLE VI

*Effect of various rosin acid derivatives when added to Paulding clay soil in amounts of 0.1% on the dry soil weight*

| Treatment Material | Average Granule Retention, Percent |
|---|---|
| Control | 20.8 |
| Salts of Commercial Abietic Acid: | |
| Ammonium abietate | 45.4 |
| Barium abietate | 33.5 |
| Calcium abietate | 43.2 |
| Cobalt abietate | 26.3 |
| Cupric abietate | 53.6 |
| Ferric abietate | 31.6 |
| Magnesium abietate | 42.5 |
| Potassium abietate | 53.8 |
| Sodium abietate | 59.0 |
| Zinc abietate | 54.8 |
| Lead abietate | 36.5 |
| Salts of Commercial Products Containing Rosin Acid: | |
| Sodium salt of "Covoil" [1] | 37.9 |
| Sodium salt of "Liqro" [1] | 45.5 |
| Sodium salt of "Resoil" [1] | 31.7 |
| Sodium salt of "Rosoil AH" [1] | 37.4 |
| Sodium salt of "Indusoil," Regular Grade [1] | 39.6 |
| Sodium salt of "Indusoil," Triple Distilled | 33.4 |
| Ammonium salt of "Acintol D" [2] | 30.6 |
| Sodium salt of "Low Viscosity Whole Tall Oil" [1] | 38.9 |
| Sodium salt of rosin still bottoms (Vinsol NVX) [3] | 45.2 |
| Sodium salt of commercial abietic acid [3] | 33.9 |
| Dresinate 214 [5] | 49.5 |
| Dresinate 87 [5] | 48.0 |
| Dresinate 731 [5] | 61.9 |
| Dresinate 90 [5] | 53.3 |
| Dresinate X [5] | 54.1 |
| Sodium salt of Wood Rosin Grade FF [3] | 38.0 |
| Sodium salt of "Staybelite" resin [7] | 29.1 |
| Sodium salt of "Belro" resin [8] | 41.1 |
| Sodium salt of 731-D resin [10] | 29.4 |
| Amine Salts of Abietic Acid: | |
| Butyl amine salt of commercial abietic acid | 45.1 |
| Di (2-ethyl hexyl) amine salt of commercial abietic acid | 28.6 |
| Ethyl amine salt of commercial abietic acid | 46.1 |

[1] Whole and refined tall oils (West Virginia Pulp and Paper Co.).
[2] Refined tall oil (Arizona Chemical Company).
[3] Products of Hercules Powder Company.
[5] Sodium salts of wood rosins (Hercules Powder Company).
[6] Potassium salts of wood rosins (Hercules Powder Company).
[7] Hydrogenated wood rosin (Hercules Powder Company).
[8] Low acid No. rosin (Hercules Powder Company).
[10] Dehydrogenated rosin (Hercules Powder Company).

With respect to the tests made with crude rosin acid-containing materials, soil granule stability tests have been made with other materials present or likely to be present in the crude products. These tests, reported below, indicate that the rosin acid fraction is the active ingredient of these crude materials.

TABLE VII

*Effect of other materials in crude rosin-acid-containing materials, when added to Paulding clay soil in amounts of 0.1% on the dry soil weight*

| Treatment Material | Average Granule Retention, Percent |
|---|---|
| Control | 20.8 |
| Sodium oleate | 26.4 |
| Sodium salt of raw linseed oil [1] | 15.1 |
| Sodium salt of pine wood lignin | 23.9 |

[1] Contains linoleic and linolenic acids found in tall oil.

Another method of investigating soil granular stability is as follows:

Soils were thoroughly air dried at 70° C., under vacuum and pulverized to pass a 20-mesh sieve. Two hundred grams of the dry soil was placed in a small size pugmill mixer on the Brabender plastograph. Varying amounts of water, containing the desired concentration of conditioner material on the dry weight of the soil dissolved in this water, were poured on to the dry soil and the whole mixed in the plastograph at 60 R. P. M. for 15 minutes. This mixture was compacted in a standard Harvard miniature compaction tester, using a 20-pound spring load, ten tamps per layer and five layers per cylinder. The compacted soil cylinders were thoroughly air dried at room temperature and pressure. The dried cylinder was dropped into the Brabender plastograph in a preset position at the right end of the pugmill. The soil cylinder was worked in the plastograph until the energy to work curve of this machine attained a substantially constant level. A dry screening analysis was then run on this broken up cylinder, followed by a wet sieving. This was done by a machine which raised and lowered the nest of sieves through the water at the rate of 30 R. P. M., and using a 4-inch stroke. Materials were wet sieved for 30 minutes. In both the wet and dry sieving, a nest of U. S. Standard 5, 10, 18, 35 and 60 mesh sieves were used. The results of the tests are reported in Table VIII below.

TABLE VIII

CECIL CLAY LOAM SOIL

| Treatment | Soil Cylinder compaction | | Dry Sieve Analysis—Percent of Total Soil Retained on U. S. Standard Mesh | | | | | | Wet Sieve Analysis, Percent of Total Soil Retained On All Sieves (Dry Basis) | | | | | Ratio of Total Soil Retained On All Sieves After Wet Sieving To Total Soil Retained On All Sieves After Dry Sieving, Percent | Ratio of Total Soil Retained On Wet Sieving To The Total Soil Sample Wet Sieved, Percent |
|---|---|---|---|---|---|---|---|---|---|---|---|---|---|---|---|
| | Density, Lbs. per Cu. Ft. | Moisture Content, Percent | 5 | 10 | 18 | 35 | 60 | Thru 60 | 5 | 10 | 18 | 35 | 60 | | |
| Control—no treatment | 99.5 | 4.4 | 0.6 | 1.6 | 2.4 | 24.2 | 22.3 | 48.9 | 0.0 | 0.0 | 2.7 | 29.1 | 68.2 | 66.4 | 34.0 |
| 0.1% "Krilium" 6 | 105.1 | 3.2 | 3.6 | 1.4 | 2.1 | 20.4 | 23.3 | 49.2 | 0.0 | 0.0 | 2.2 | 29.8 | 68.0 | 64.0 | 32.5 |
| 0.1% Sodium abietate | 104.6 | 4.5 | 0.0 | 0.0 | 1.2 | 23.7 | 22.9 | 53.3 | 0.0 | 0.0 | 5.5 | 27.3 | 64.4 | 80.5 | 38.0 |
| 0.5% Sodium abietate | 100.3 | 5.9 | 6.0 | 1.6 | 2.5 | 30.8 | 23.5 | 35.7 | 8.0 | 3.3 | 7.0 | 41.7 | 40.0 | 58.1 | 47.8 |
| Control—no treatment | 101.5 | 7.2 | 8.0 | 2.7 | 3.2 | 26.1 | 21.4 | 39.0 | 0.0 | 0.0 | 3.1 | 30.7 | 66.2 | 52.5 | 32.1 |
| 0.1% "Krilium" 6 | 105.4 | 8.5 | 13.9 | 4.0 | 3.5 | 26.4 | 22.4 | 29.7 | 0.0 | 0.0 | 3.0 | 24.0 | 73.0 | 48.5 | 34.1 |
| 0.1% Sodium abietate | 100.3 | 7.2 | 3.1 | 0.9 | 1.7 | 27.7 | 23.7 | 43.0 | 2.2 | 2.4 | 3.3 | 30.6 | 61.3 | 74.8 | 42.6 |
| 0.5% Sodium abietate | 103.8 | 8.2 | 11.3 | 5.5 | 4.7 | 29.7 | 20.6 | 28.1 | 16.5 | 9.8 | 6.6 | 24.1 | 43.0 | 72.1 | 53.2 |
| Control—no treatment | 108.9 | 9.7 | 16.7 | 5.5 | 4.7 | 29.8 | 19.6 | 23.6 | 0.0 | 0.0 | 2.1 | 27.6 | 70.3 | 42.2 | 32.2 |
| 0.1% "Krilium" 6 | 107.7 | 9.0 | 4.4 | 2.4 | 3.1 | 29.9 | 21.8 | 38.4 | 0.0 | 0.0 | 3.7 | 34.6 | 61.8 | 66.5 | 40.9 |
| 0.1% Sodium abietate | 106.9 | 9.5 | 4.6 | 2.0 | 2.1 | 35.3 | 26.1 | 29.9 | 3.5 | 4.4 | 2.6 | 27.8 | 61.8 | 60.4 | 42.3 |
| 0.5% Sodium abietate | 103.5 | 8.9 | 8.8 | 3.1 | 2.3 | 31.9 | 25.1 | 29.1 | 13.4 | 8.4 | 7.3 | 21.1 | 49.8 | 87.5 | 62.2 |
| Control—no treatment | 112.2 | 13.4 | 24.6 | 10.1 | 7.4 | 18.9 | 12.9 | 26.1 | 0.0 | 0.0 | 4.2 | 30.0 | 65.8 | 43.8 | 32.3 |
| 0.1% "Krilium" 6 | 116.2 | 11.9 | 18.2 | 10.8 | 7.1 | 21.7 | 14.9 | 25.6 | 0.0 | 2.5 | 8.3 | 32.4 | 56.8 | 57.6 | 42.9 |
| 0.1% Sodium abietate | 115.0 | 11.5 | 16.0 | 6.2 | 7.0 | 28.1 | 16.4 | 26.2 | 21.1 | 13.5 | 6.9 | 22.4 | 36.1 | 72.1 | 53.2 |
| 0.5% Sodium abietate | 115.9 | 11.9 | 16.4 | 12.0 | 11.5 | 24.7 | 15.2 | 30.8 | 22.8 | 16.5 | 13.0 | 18.9 | 28.8 | 98.4 | 68.1 |
| 0.1% Sodium abietate | 111.1 | 13.6 | 15.5 | 9.8 | 8.8 | 22.4 | 14.6 | 28.9 | 34.0 | 14.6 | 6.0 | 14.5 | 30.9 | 87.4 | 62.2 |
| 0.5% Sodium abietate | 113.1 | 13.1 | 22.3 | 14.0 | 9.4 | 19.3 | 11.7 | 23.3 | 30.0 | 19.7 | 12.2 | 15.8 | 22.6 | 85.5 | 65.6 |
| Control—no treatment | 95.5 | 20.0 | 24.2 | 9.3 | 6.3 | 18.9 | 13.9 | 27.4 | 0.0 | 0.0 | 2.9 | 27.9 | 69.2 | 46.2 | 33.6 |
| 0.1% "Krilium" 6 | 98.5 | 18.4 | 25.2 | 8.8 | 6.2 | 19.0 | 13.2 | 26.8 | 0.0 | 1.8 | 7.5 | 40.4 | 50.2 | 57.7 | 42.2 |
| 0.1% Sodium abietate | 97.1 | 19.0 | 24.5 | 13.1 | 8.3 | 19.1 | 12.1 | 13.8 | 28.2 | 38.2 | 19.1 | 7.2 | 8.0 | 27.5 | 77.8 | 55.9 |
| 0.5% Sodium abietate | 96.9 | 19.0 | 34.6 | 10.1 | 5.1 | 7.0 | 28.8 | 17.5 | 16.6 | 10.5 | 9.2 | 23.1 | 40.6 | 65.7 | 54.2 |

The data indicates that at comparable tamped cylinder densities and soil moisture contents at the time of tamping, the ratio of coarse aggregates to fine aggregates after wet sieving is much higher in the case of samples treated with sodium rosinate than was the case where they were untreated. The total percent soil retained after wet sieving was also much higher in the case of the treated samples.

As indicated in the above tables, there is an optimum water content of the soil at which the addition of the soil conditioner is most beneficial. The soil conditioner is effective at all soil moisture concentrations which exist in practice, but as previously stated, there is an optimum soil moisture content at which the best results are obtained. However, the soil moisture content should always be below the plastic limit when the soil conditioner is added. If the soil moisture content is above the plastic limit when the conditioner is added, the soil dries to a hard mass of no agricultural value.

From the above description of the invention, its many advantages are apparent. Since the rosin acids and their salts are available in large quantities at low cost, and since they are effective at low concentrations, soil conditioning can now be carried out at a much lower cost to achieve a given degree of soil granule stability. In addition, in comparison to water-soluble polyelectrolytes, my material is not hygroscopic nor does it yield solutions of high viscosity. Thus, it can more readily be applied by either the powder or solution method. My material also has the advantage that it can be applied in water-soluble form, such as the sodium rosinate, and later converted to a water-insoluble form, either by the calcium normally present in the soil or by lime addition. These water-insoluble forms retain much of their effectiveness, but are not appreciably lost by leaching.

What is claimed is:

1. The method of improving the stability of granules of agricultural soils suitable for cultivation to the action of water which comprises incorporating in said soils containing soil moisture below the plastic limit from 0.005% to below 0.05% based on said soil of a rosin acid compound.

2. The method of improving the stability of granules of agricultural soils suitable for cultivation to the action of water which comprises incorporating in said soils containing soil moisture below the plastic limit from 0.005% to below 0.05% based on said soil of a rosin acid salt.

3. Method as claimed in claim 2 in which the rosin acid salt is sodium rosinate.

4. Method as claimed in claim 2 in which the rosin acid salt is ammonium rosinate.

5. Method as claimed in claim 2 in which the rosin acid salt is the sodium salt of tall oil.

6. Method as claimed in claim 2 in which the rosin acid salt is the sodium salt of wood rosin.

7. The method of improving the stability of granules of agricultural soils suitable for cultivation to the action of water which comprises incorporating in said soils containing soil moisture below the plastic limit from 0.005% to below 0.05% based on said soil of tall oil.

8. The method of improving the stability of granules of agricultural soils suitable for cultivation to the action of water which comprises incorporating in said soils containing soil moisture below the plastic limit from 0.005% to below 0.05% based on said soil of an amine salt of rosin acid.

References Cited in the file of this patent

UNITED STATES PATENTS

| | | |
|---|---|---|
| 2,187,532 | Leatherman | Jan. 16, 1940 |
| 2,323,928 | Miller | July 13, 1943 |
| 2,323,929 | Miller | July 13, 1943 |
| 2,357,124 | Miller | Aug. 29, 1944 |
| 2,369,682 | Miller | Feb. 20, 1945 |
| 2,377,639 | Miller | June 5, 1945 |
| 2,625,471 | Mowry et al. | Jan. 13, 1953 |